(12) United States Patent
Kim

(10) Patent No.: US 12,294,048 B2
(45) Date of Patent: May 6, 2025

(54) FINISHING TAPE AND SECONDARY BATTERY COMPRISING SAME

(71) Applicant: Samsung SDI Co., Ltd., Yongin-si (KR)

(72) Inventor: Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 217 days.

(21) Appl. No.: 16/771,873

(22) PCT Filed: Dec. 18, 2017

(86) PCT No.: PCT/KR2017/014962
§ 371 (c)(1),
(2) Date: Jun. 11, 2020

(87) PCT Pub. No.: WO2019/124572
PCT Pub. Date: Jun. 27, 2019

(65) Prior Publication Data
US 2021/0175536 A1    Jun. 10, 2021

(51) Int. Cl.
*H01M 10/04*    (2006.01)
*H01M 10/0525*    (2010.01)
(Continued)

(52) U.S. Cl.
CPC ... *H01M 10/0468* (2013.01); *H01M 10/0525* (2013.01); *H01M 10/0587* (2013.01);
(Continued)

(58) Field of Classification Search
CPC ......... H01M 10/0468; H01M 10/0525; H01M 10/0587; H01M 10/04; H01M 10/0481;
(Continued)

(56) References Cited

U.S. PATENT DOCUMENTS

| | | |
|---|---|---|
| 8,980,464 B2 | 3/2015 | Kim et al. |
| 9,865,848 B2 | 1/2018 | Kim et al. |

(Continued)

FOREIGN PATENT DOCUMENTS

| | | |
|---|---|---|
| CN | 102549801 A | 7/2012 |
| CN | 106133089 A | 11/2016 |

(Continued)

OTHER PUBLICATIONS

English Translation of JP2018141086A—Adhesive Tape; Nitto Denko Corp; Sep. 13, 2018 with priority date of Feb. 28, 2017 (Year: 2018).*

(Continued)

*Primary Examiner* — Matthew T Martin
*Assistant Examiner* — Adam J Francis
(74) *Attorney, Agent, or Firm* — Womble Bond Dickinson (US) LLP

(57) ABSTRACT

Disclosed are a finishing tape which is capable of reducing flow of an electrode assembly in a casing and a secondary battery including the same. As an example, disclosed is a finishing tape comprising: a first layer formed of a resin and forming a substrate; and a second layer formed on at least one side of the first layer and including a microsphere structure.

3 Claims, 8 Drawing Sheets

(51) Int. Cl.
    *H01M 10/0587*     (2010.01)
    *H01M 50/121*     (2021.01)
    *H01M 50/124*     (2021.01)
    *H01M 50/131*     (2021.01)

(52) U.S. Cl.
    CPC ....... *H01M 50/121* (2021.01); *H01M 50/124* (2021.01); *H01M 50/131* (2021.01)

(58) Field of Classification Search
    CPC ............. H01M 50/121; H01M 50/124; H01M 50/131; H01M 50/595
    See application file for complete search history.

(56) References Cited

U.S. PATENT DOCUMENTS

| | | | |
|---|---|---|---|
| 10,286,420 B2 | 5/2019 | Lee | |
| 10,293,366 B2 | 5/2019 | Lee | |
| 10,293,367 B2 | 5/2019 | Lee | |
| 10,693,195 B2 | 6/2020 | Do et al. | |
| 2007/0154787 A1* | 7/2007 | Jang | H01M 10/0587 429/174 |
| 2012/0115025 A1 | 5/2012 | Kim et al. | |
| 2015/0147640 A1 | 5/2015 | Kim et al. | |
| 2015/0307752 A1 | 10/2015 | Park et al. | |
| 2016/0141581 A1* | 5/2016 | Sasaki | H01M 50/457 429/144 |
| 2016/0359201 A1 | 12/2016 | Do et al. | |
| 2017/0130100 A1 | 5/2017 | Lee | |
| 2017/0137670 A1 | 5/2017 | Lee | |
| 2017/0152409 A1 | 6/2017 | Lee | |
| 2017/0155107 A1 | 6/2017 | Akiike et al. | |
| 2017/0275506 A1* | 9/2017 | Sasaki | H01G 11/78 |
| 2018/0333745 A1 | 11/2018 | Lee | |
| 2018/0339310 A1 | 11/2018 | Lee | |
| 2018/0339311 A1 | 11/2018 | Lee | |

FOREIGN PATENT DOCUMENTS

| | | | |
|---|---|---|---|
| CN | 106450494 A | 2/2017 | |
| JP | 11-260411 A | 9/1999 | |
| JP | 11-329439 A | 11/1999 | |
| JP | 2005-314708 A | 11/2005 | |
| JP | WO2017/013914 A1 | 1/2017 | |
| JP | 2018141086 A * | 9/2018 | ............. B01J 13/14 |
| KR | 10-2007-0008084 A | 1/2007 | |
| KR | 10-2009-0088761 A | 8/2009 | |
| KR | 10-2012-0035090 A | 4/2012 | |
| KR | 10-1552630 B1 | 9/2015 | |
| KR | 10-2016-0100081 A | 8/2016 | |

OTHER PUBLICATIONS

International Search Report with English Translation for corresponding Korean International Application No. PCT/KR2017/014962, dated Sep. 5, 2018, 5 pages.

EPO Extended European Search Report dated Jun. 29, 2021, issued in corresponding European Patent Application No. 17935545.8 (15 pages).

Chinese Office Action issued Jan. 18, 2023, including Search Report dated Jan. 9, 2023, for corresponding Application No. 201780098152.1, including English translation, 20 pages.

\* cited by examiner

FINISHING TAPE AND SECONDARY BATTERY COMPRISING SAME

CROSS-REFERENCE TO RELATED APPLICATION(S)

This application is a National Phase Patent Application of International Patent Application Number PCT/KR2017/014962, filed on Dec. 18, 2017. The entire contents of which are incorporated herein by reference.

TECHNICAL FIELD

The present disclosure relates to a finishing tape which is capable of reducing flow of an electrode assembly in a casing and a secondary battery including the same.

BACKGROUND ART

In general, secondary batteries can be charged and discharged, unlike primary batteries, which are not rechargeable once discharged. Secondary batteries are widely used in various applications including advanced electronic devices such as cellular phones, notebook computers, camcorders, etc.

Specifically, lithium secondary batteries operating at 3.6 V are rapidly expanding their uses and applications in place of nickel-cadmium (Ni—Cd) batteries or nickel-hydride (Ni-MH) batteries, which have widely been used as power sources for electronic devices, because the operating voltage of these lithium secondary batteries is approximately three times higher than that of nickel-cadmium (Ni—Cd) batteries or nickel-hydride (Ni-MH) batteries and the lithium secondary batteries have excellent energy density per unit weight. Lithium secondary batteries Lithium secondary batteries generally employ a lithium oxide positive active material, and a carbon negative active material. Such lithium secondary batteries may be classified as liquid electrolyte cells or polymer electrolyte cells based on the kind of electrolyte used. Lithium batteries using a liquid electrolyte are generally referred to as lithium-ion batteries, and lithium batteries using a polymer electrolyte are generally referred to as lithium-polymer batteries. Typically, lithium secondary batteries are manufactured in cylindrical, rectangular, or pouch-type shapes.

In the lithium secondary batteries, an electrode assembly is inserted into a casing together with the electrolyte or electrolytic solution. In this regard, in order to secure mechanical/electrical reliability of the battery, the electrode assembly needs to be fixedly positioned in the casing.

DESCRIPTION OF EMBODIMENTS

Technical Problem

The present disclosure provides a finishing tape which is capable of reducing flow or movement of an electrode assembly in a casing and a secondary battery including the same.

Solution to Problem

According to an embodiment of the present disclosure, provided is a finishing tape including a first layer formed of a resin and forming a substrate; and a second layer formed on at least one side of the first layer and including a microsphere structure.

Here, the microsphere structure may be configured to react with an electrolytic solution including a lithium salt to cause a volumetric expansion.

In addition, the electrolytic solution may include at least one of a non-aqueous organic electrolytic solution having a lithium salt, such as $LiPF_6$, $LiBF_4$, or $LiClO_4$, and a high-purity organic solvent mixed therein, and a polymer electrolytic solution having a polymer electrolyte.

In addition, the microsphere structure of the second layer may include a shell formed of a thermoplastic resin and an encapsulating member encapsulated by the shell and including hydrocarbon.

According to an embodiment of the present disclosure, provided is a secondary battery including a casing having an internal space; an electrode assembly inserted into the casing with an electrolyte; a finishing tape covering the electrode assembly and undergoing a volumetric expansion when reacting with the electrolyte; and a cap plate coupled to an upper portion of the casing and sealing the casing.

Here, the electrolytic solution may include at least one of a non-aqueous organic electrolytic solution having a lithium salt, such as $LiPF_6$, $LiBF_4$, or $LiClO_4$, and a high-purity organic solvent mixed therein, and a polymer electrolytic solution having a polymer electrolyte.

In addition, the finishing tape may include a first layer formed of a resin and forming a substrate; and a second layer formed on at least one side of the first layer and including a microsphere structure.

In addition, the microsphere structure of the second layer may include a shell formed of a thermoplastic resin and an encapsulating member encapsulated by the shell and including hydrocarbon.

In addition, the microsphere structure may have a diameter in a range of 5 μm to 50 μm.

Advantageous Effects of Disclosure

As described above, in the finishing tape according to the present disclosure and the secondary battery using the same, a layer having a microsphere structure is formed on at least one surface of the finishing tape, and, when the finishing tape reacts with an electrolytic solution, the finishing tape may expand due to a volumetric expansion of the microsphere structure and fix the electrode assembly, thereby suppressing an increasing of resistance due to movement of the electrode assembly in the casing.

[Explanation of Reference Numerals]

Figure 1:
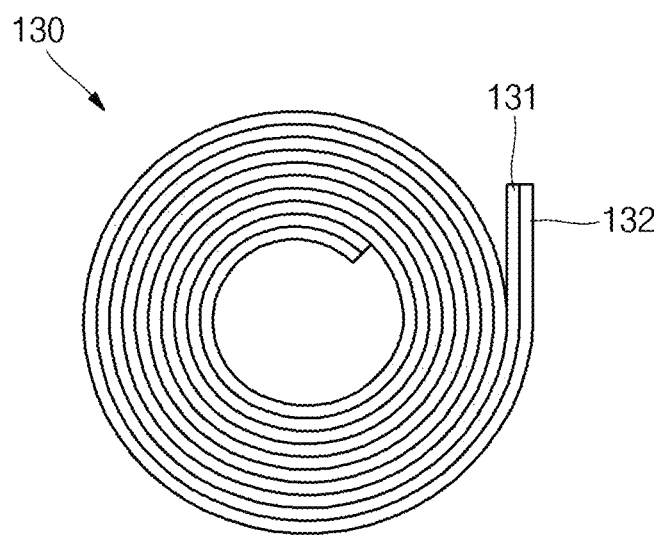
FIG. 1 illustrates a state in which a finishing tape according to an embodiment is wound.

100: Secondary battery
110: Casing
120: Electrode assembly
130: Finishing tape
131: First layer
132: Second layer
150: Cap assembly
160: Insulation case

MODE OF DISCLOSURE

Hereinafter, examples of embodiments of the invention will be described in detail with reference to the accompanying drawings such that they can readily be made and used by those skilled in the art.

Figure 2:
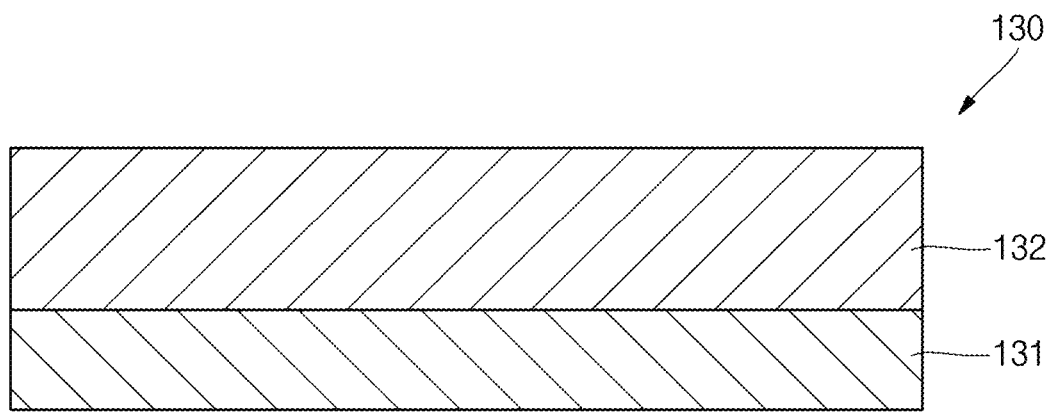
FIG. 2 is a cross-sectional view illustrating the finishing tape according to an embodiment.

FIG. 1 illustrates a state in which a finishing tape according to an embodiment is wound. FIG. 2 is a cross-sectional view illustrating the finishing tape according to an embodiment.

Referring to FIGS. 1 and 2, the finishing tape 130 according to an embodiment may be provided in a wound state, and may include a first layer 131 and a second layer 132.

The first layer 131 may constitute a substrate layer and may define an outermost surface contacting the casing after being covered by the electrode assembly. The first layer 131 may be formed of a material selected from polyethylene (PE), polystyrene (PS) and oriented polystyrene (OPS). Since the first layer 131 is an electrically insulating material, it may prevent an electrical short from occurring between the electrode assembly and the casing.

The second layer 132 may be formed along one surface of the first layer 131. The second layer 132 may be positioned to make contact with the electrode assembly when the finishing tape 130 is combined with the electrode assembly. Here, the second layer 132 may include an expandable material which causes a volumetric expansion when it reacts with an electrolyte or electrolytic solution present in the casing 110. More specifically, the second layer 132 may be formed in a microsphere structure.

The microsphere structure may include an encapsulating member in a thermoplastic resin shell so as to be expandable when reacting with an electrolyte. For example, the encapsulating member included in the shell may include hydrocarbon. Even if the hydrocarbon having hydrophobicity does not react with water, it still has a capability of absorbing the electrolyte. The thus configured microsphere structure operates according to the mechanism in which the electrolyte reacts with the encapsulating member when it penetrates into the shell, and the encapsulating member is then expanded. Accordingly, since the volume of the second layer 132 including the microsphere structure is increased, the electrode assembly may be fixedly positioned by filling gaps between the casing and the electrode assembly, thereby suppressing flow or movement of the electrode assembly in the casing and preventing resistance due to the flow or movement of the electrode assembly from increasing.

In addition, the microsphere may have a diameter in a range of 5 μm to 50 μm. When the microsphere has a diameter of greater than or equal to 5 μm in the finishing tape applied to the electrode assembly, the fixing of the finishing tape to the electrode assembly and prevention of the volumetric expansion thereof may be advantageously achieved. When the microsphere has a diameter of less than or equal to 50 μm, it is advantageous to fill gaps between the casing and the electrode assembly, resulting after reacting with an electrolytic solution.

Hereinafter, a configuration of a secondary battery according to an embodiment will be described.

Figure 3:
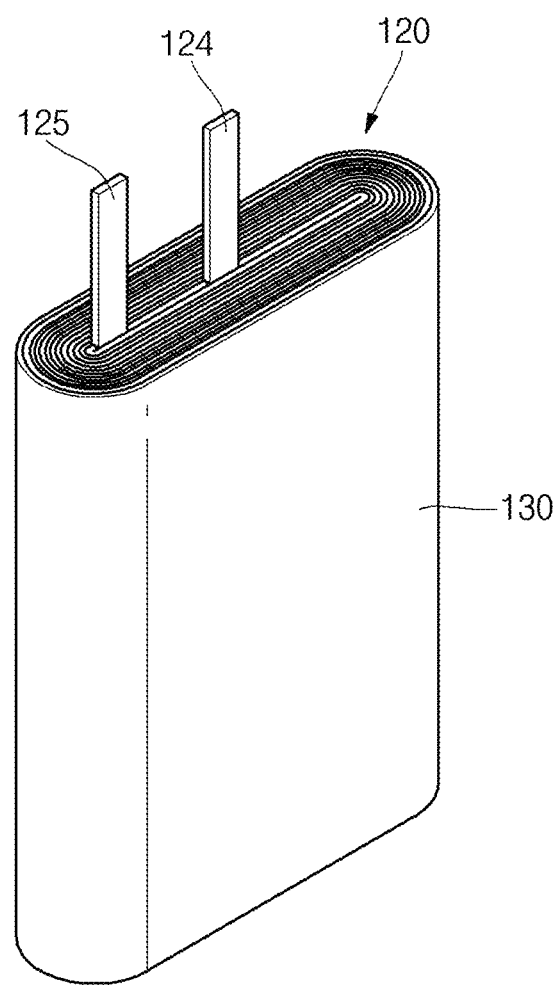
FIG. 3 is a perspective view illustrating a state in which a finishing tape is attached to an electrode assembly in a secondary battery according to an embodiment.
Figure 4:
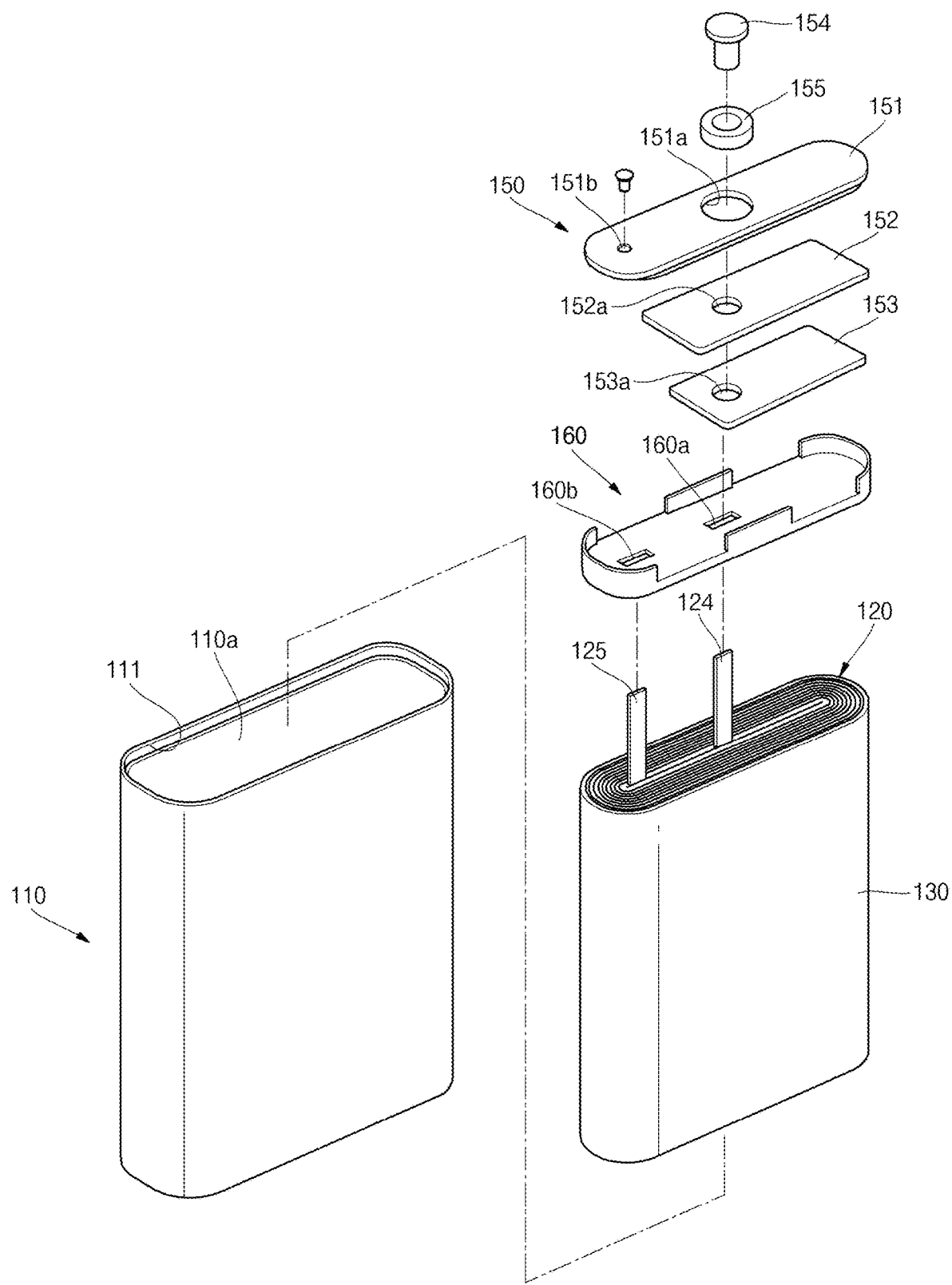
FIG. 4 is an exploded perspective view of the secondary battery according to an embodiment.

FIG. 3 is a perspective view illustrating a state in which a finishing tape is attached to an electrode assembly in a secondary battery according to an embodiment. FIG. 4 is an exploded perspective view of the secondary battery according to an embodiment.

Referring to FIGS. 3 and 4, the secondary battery 100 according to an embodiment includes the casing 110, the electrode assembly 120, the finishing tape 130, and a cap assembly 150. In addition, an insulation case 160 may further be formed between the electrode assembly 120 and the cap assembly 150.

The casing 110 is substantially hexahedral. The casing 110 has an internal space 110, and has an opening at its top portion. The casing 110 may be made of aluminum (Al), iron (Fe), or alloys thereof. In addition, the inner surface of the casing 110 may be subjected to insulation treatment. The casing 110 may include a groove 111 formed along the periphery of its top portion to allow the insulation case 160 to be mounted in the groove 111 in a subsequent process. In addition, the electrode assembly 120 may be accommodated in the internal space 110a of the casing 110 with an electrolytic solution.

Here, the electrolytic solution may be an organic liquid containing a salt-injection allowing lithium ions to move between positive and negative electrode plates of the electrode assembly 120, and may include a non-aqueous organic electrolytic solution having a lithium salt, such as $LiPF_6$, $LiBF_4$, or $LiClO_4$, and a high-purity organic solvent mixed therein, or a polymer electrolytic solution having a polymer electrolyte.

The electrode assembly 120 is accommodated in the internal space 110a of the casing 110. The electrode assembly 120 includes a positive electrode plate coated with a positive active material (e.g., lithium cobalt oxide ($LiCoO_2$)), a negative electrode plate coated with a negative active material (e.g., graphite), and a separator positioned between the positive electrode plate and the negative electrode plate to prevent an electrical short-circuit and to allow the lithium ions to move between the positive and negative electrode plates. The electrode assembly 120 may be formed by winding a stacked structure of the positive electrode plate, the separator, and the negative electrode plate multiple times in a substantially jellyroll-like configuration. The positive electrode plate may be made of an aluminum (Al) foil, the negative electrode plate may be made of a copper (Cu) foil, and the separator may be made of polyethylene (PE) or polypropylene (PP) material.

In addition, an upwardly extending positive electrode lead 125 is connected to the positive electrode plate, and an upwardly extending negative electrode lead 124 is connected to the negative electrode plate. Here, the positive electrode lead 125 may be made of aluminum (Al), and the negative electrode lead 124 may be made of nickel (Ni).

In addition, the electrolytic solution may be injected into the casing 110 together with the electrode assembly 120.

During charging and discharging, the electrolytic solution serves as a medium for movement of the lithium ions generated by an electrochemical reaction taking place between the positive electrode plate and the negative electrode plate within the battery.

As described above, the finishing tape 130 may be coupled to the electrode assembly 120 while covering the outer circumferential surface of the electrode assembly 120. The finishing tape 130 covers the outer circumferential surface of the electrode assembly 120 in a state in which the first layer thereof faces the casing 110 and the second layer 132 thereof faces the electrode assembly 120. Accordingly, the finishing tape 130 may cover the electrode assembly 120 and thus may prevent the electrode assembly 120 from expanding in volume.

In addition, if the electrolyte in the casing 110 infiltrates the finishing tape 130, the microsphere forming the second layer 132 of the finishing tape 130 may react with the electrolyte and expands. Accordingly, expansion of the second layer 132 may be caused, thereby fixing the position of the electrode assembly 120 in the casing 110 and suppressing movement of the electrode assembly 120. The structure and operation of the microsphere in the second layer 132 will later be described.

The cap assembly 150 is coupled to a top portion of the casing 110. The cap assembly 150 may include a cap plate 151, an insulation plate 152, a terminal plate 153, an electrode terminal 154 and an insulation gasket 155.

The cap plate 151 is coupled to the opening 110a of the can 110 and may be shaped of a plate having long sides and short sides. The cap plate 151 is welded at its peripheral portion in a state in which it is coupled to the opening 110a of the can 110 to thus seal the can 110. The cap plate 151 includes a terminal hole 151a to be engaged with the electrode terminal 154 and an electrolyte injection hole 151b for electrolyte injection. Here, the electrode terminal 154 and the insulation gasket 155 are coupled to the terminal hole 151a, thereby coupling the electrode terminal 154 and lower structures thereof to each other. In addition, once the electrolyte is injected, a plug is engaged with the electrolyte injection hole 151b to then be fixedly sealed with the cap plate 151, thereby preventing leakage of the electrolyte.

The insulation plate 152 is positioned under the cap plate 151. A terminal hole 152a corresponding to the terminal hole 151a of the cap plate 151 is formed in the insulation plate 152, and the insulation gasket 155 is engaged with the terminal hole 152a. In addition, the terminal hole 152a of the insulation plate 152 is passed through by a lower portion of the electrode terminal 154.

The terminal plate 153 is positioned under the insulation plate 152. A terminal hole 153a corresponding to the terminal hole 152a of the insulation plate 152 is formed in the terminal plate 153, and the electrode terminal 154 is engaged with the terminal hole 153a. In addition, the negative electrode lead 124 of the electrode assembly 120 may be coupled to the terminal plate 153. Therefore, the electrode terminal 154 may be electrically connected to the negative electrode lead 124 of the electrode assembly 120.

The electrode terminal 154 passes through the terminal holes 151a and 152a of the cap plate 151 and insulation plate 152 in the order in which the underlying structures are coupled thereto, as described above, and is then electrically connected to the negative electrode lead 124.

The insulation gasket 155 is located between the electrode terminal 154 and the cap plate 151 to prevent the electrode terminal 154 and the cap plate 151 from electrically contacting each other.

The insulation case 160 positioned above the electrode assembly 120 may be coupled to the opening 110a of the can 110. More specifically, the insulation case 160 may be coupled to a stepped portion 111 of the can 110. Lead passage holes 160a and 160b are formed in the insulation case 160 to allow the negative electrode lead 124 and the positive electrode lead 125 to penetrate the insulation case 160.

Hereinafter, the operation of a finishing tape in a secondary battery according to an embodiment will be described in more detail.

Figure 5A:
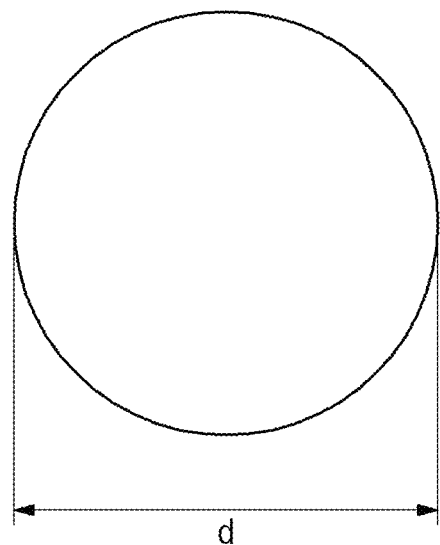
FIG. 5A is a perspective view illustrating a diameter of a microsphere of the finishing tape according to an embodiment.
Figure 5B:
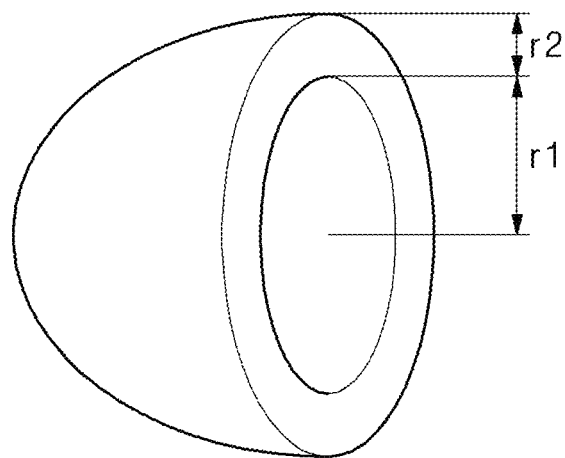
FIG. 5B is a perspective view illustrating a radius of a microsphere of the finishing tape according to an embodiment.
Figure 6A:
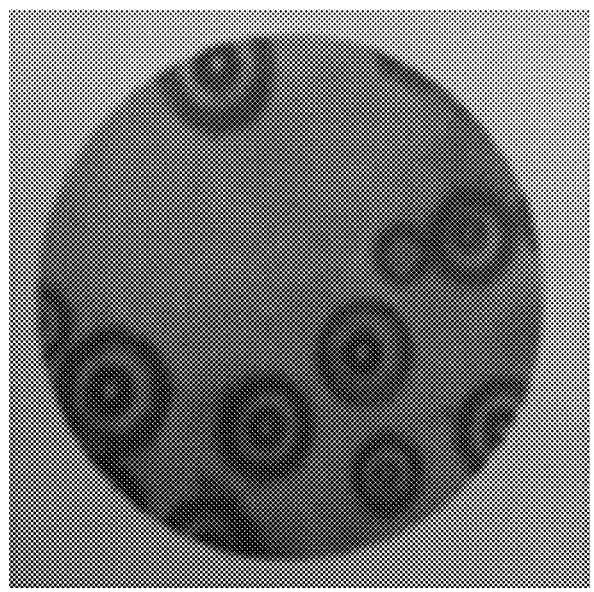
FIGS. 6A and 6B are optical microscopic images showing microspheres before and after foaming in the finishing tape according to an embodiment.
Figure 6B:
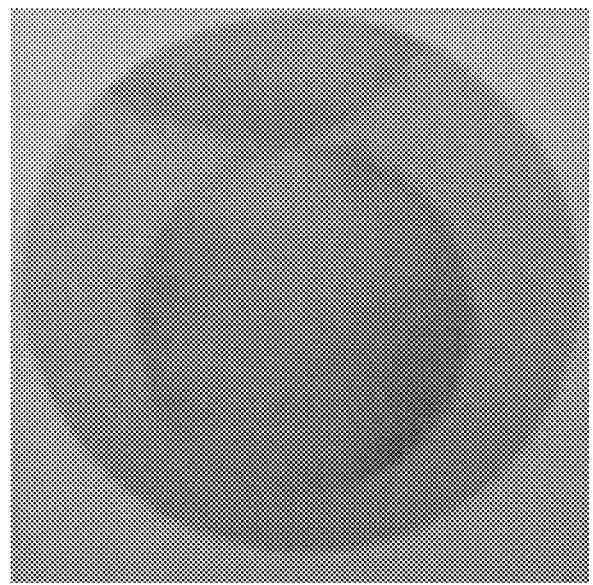
Figure 7A:
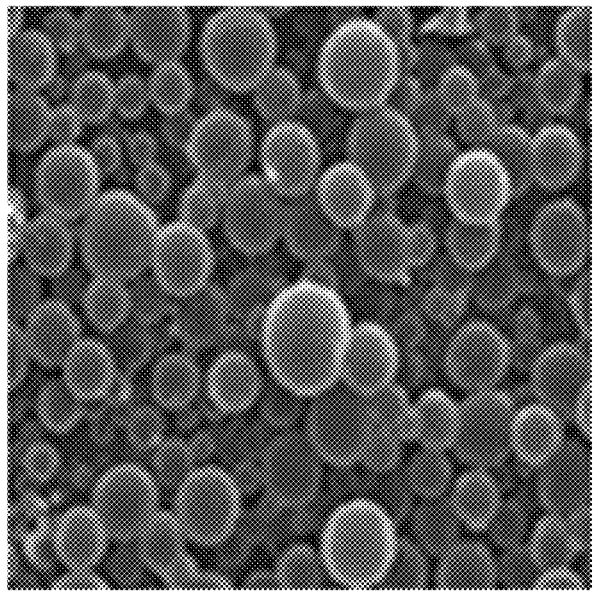
FIGS. 7A and 7B are SEM photographs showing microspheres before and after foaming in the finishing tape according to an embodiment
Figure 7B:
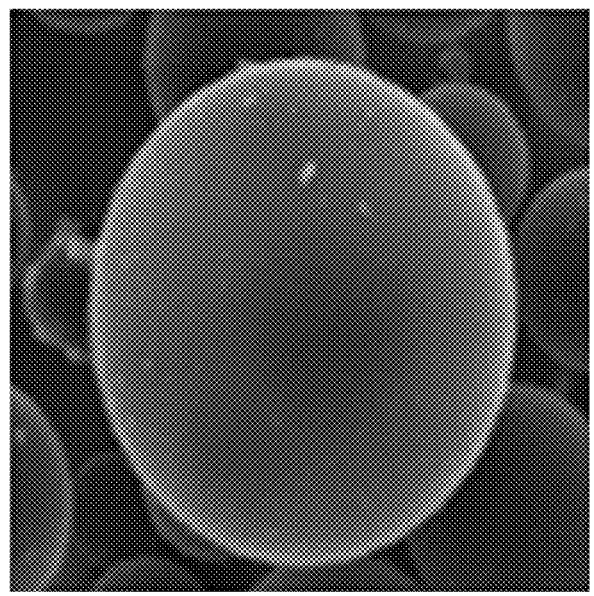

FIG. 5A is a perspective view illustrating a diameter of a microsphere of the finishing tape according to an embodiment. FIG. 5B is a perspective view illustrating a radius of a microsphere of the finishing tape according to an embodiment. FIGS. 6A and 6B are optical microscopic images showing microspheres before and after foaming in the finishing tape according to an embodiment. FIGS. 7A and 7B are SEM photographs showing microspheres before and after foaming in the finishing tape according to an embodiment.

First, referring to FIG. 5A, the microsphere forming the finishing tape 130 has a substantially spherical shape and has a predetermined diameter (d).

Next, referring to the cross-sectional view of FIG. 5B, the microsphere includes an encapsulating member having a first radius (r1) and a shell surrounding the encapsulating member and having a second radius (r2).

Here, the encapsulating member may include hydrocarbon, as described above. The hydrocarbon may be a material that does not react with water but reacts with an electrolyte and may be expandable when it reacts with the electrolyte, causing a volumetric expansion. Accordingly, the radius r1 of the hydrocarbon may increase.

In addition, the shell surrounding the encapsulating member is capable of withstanding the expansion of the encapsulating member and may have increasing radius (r1+r2) the expansion of the encapsulating member. The shell may be formed of a thermoplastic resin so as to be deformable. Examples of the material available as the thermoplastic resin may include polyethylene, nylon, polyacetal resin, polyvinyl chloride, polystyrene, ABS resin, and acryl resin, but embodiments of the disclosure are not limited to the above materials.

Next, FIGS. 6A and 7A are compared with FIGS. 6B and 7B, and the comparison result confirms that the volume of the microsphere structure is increased by the infiltration of the electrolyte, causing a volumetric expansion of the finishing tape 130 including the microsphere, and thus the electrode assembly 120 may be fixedly positioned.

Hereinafter, the effects of the present disclosure will be described through the results of the experiment in which the finishing tape according to the embodiment is allowed to react with an electrolyte.

Figure 8A:
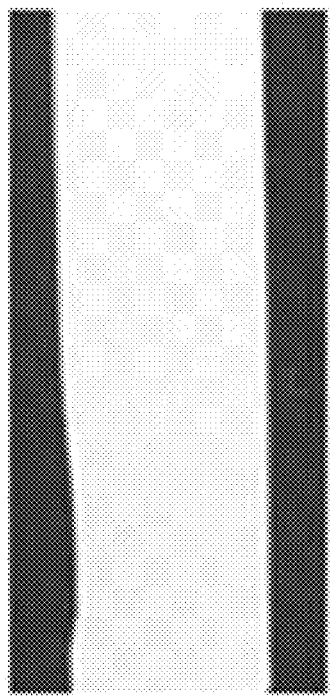
FIGS. 8A to 8C are photographs showing a process of the experiments in which the finishing tape according to an embodiment is allowed to react with an electrolyte.
Figure 8B:
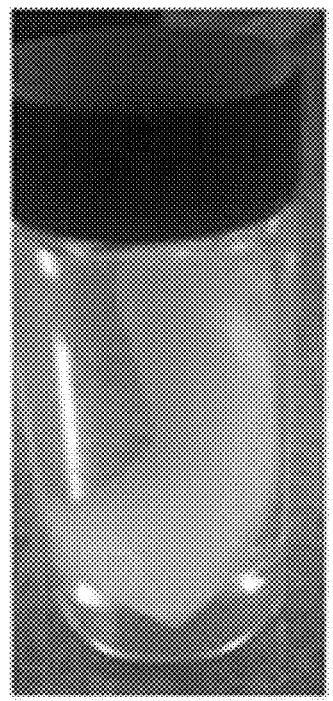
Figure 8C:
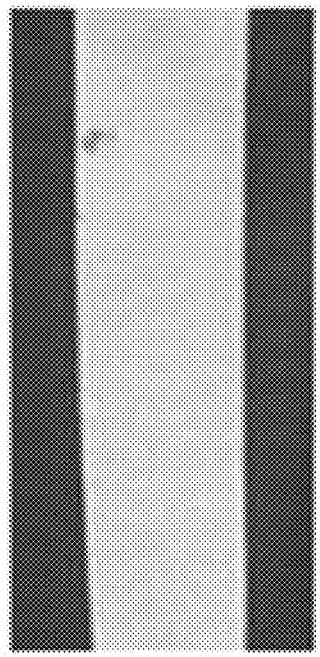

FIGS. 8A to 8C are photographs showing an experiment process in which the finishing tape according to an embodiment is allowed to react with an electrolyte.

FIGS. 8A, 8B and 8C are photographic images sequentially showing the finishing tape photographed before, during and after the experiment, respectively.

In the experiments, the electrolyte obtained by mixing 1.0 M $LiPF_6$ with EC/EMC/DEC/PC/DMC at a ratio of 2:2:2:2:2 and the finishing tape 130 including a first layer 131 formed of polyethylene and a second layer 132 having a microsphere, were used. In addition, the experiment was conducted such that the finishing tape was immersed in the electrolytic solution and, after one hour, changes in the color and thickness were observed.

The experimental results are summarized in Table 1 below.

TABLE 1

|  | Thickness of first layer (131) (μm) | Thickness of second layer (132) (μm) |
|---|---|---|
| Before experiment | 12 | 51 |
| After experiment | 12 | 81 |
| Thickness difference | 0 | 30 |

The experimental result showed the diameter of the microsphere structure was changed from 51 μm to 81 μm, confirming that there is a thickness difference of 30 μm before and after the experiment, by which the electrode assembly is fixedly positioned when the finishing tape 130 reacts with the electrolyte.

In addition, the photographs shown in FIGS. 8A and 8C were compared with each other. The comparison result visually confirmed that the color of the microsphere structure after the experiment, as shown in FIG. 8C, became pale, compared with the color of the microsphere structure before the experiment, as shown in FIG. 8A. This result is attributable to the volumetric expansion of the microsphere structure included in the second layer 132 of the finishing tape 130.

As described above, in the finishing tape 130 according to the embodiment and the secondary battery 100 using the same, the layer 132 including the microsphere structure is formed on at least one side of the finishing tape 130 to allow the finishing tape 130 to be expandable due to a volumetric expansion of the microsphere structure by reacting with the electrolytic solution, thereby preventing resistance due to flow or movement of the electrode assembly in the casing from increasing by fixing the position of the electrode assembly.

Although the foregoing embodiments have been described to practice the finishing tape of the present invention and the secondary battery using the same, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

In the finishing tape according to the embodiment and the secondary battery using the same, the finishing tape is allowed to be expandable due to a volumetric expansion of the microsphere structure when it reacts with an electrolytic solution by forming a layer including a microsphere structure on at least one side of the finishing tape, thereby preventing resistance due to flow or movement of an electrode assembly from increasing by fixing the position of the electrode assembly.

The invention claimed is:

1. A secondary battery comprising:
a casing having an internal space;
an electrode assembly inserted into the casing with an electrolyte;
a finishing tape covering the electrode assembly and undergoing a volumetric expansion when reacting with the electrolyte; and
a cap plate coupled to an upper portion of the casing and sealing the casing,
wherein the electrode assembly comprises a positive electrode plate, a negative electrode plate, and a separator disposed therebetween,
the positive electrode plate is connected to a positive electrode lead, and
the negative electrode plate is connected to a negative electrode lead,
wherein the finishing tape comprises a microsphere, and the microsphere includes a shell formed of a thermoplastic resin and an encapsulating member completely encapsulated by the shell and including hydrocarbon, and
wherein the microsphere has a diameter in a range of 15 μm to 50 μm before contacting the electrolyte,
wherein the finishing tape comprises:
a first layer formed of a resin and forming a substrate; and
a second layer formed on at least one side of the first layer and including the microsphere,
wherein the second layer is a microsphere structure including microspheres,
wherein the second layer is disposed facing the electrode assembly,
wherein the finishing tape expands in volume in a direction of the electrode assembly,
wherein a thickness of the second layer is increased by the volumetric expansion, and
wherein a difference in thickness of the finishing tape before and after contacting with the electrolyte is larger than a thickness of the first layer and smaller than a thickness of the second layer before expansion.

2. The secondary battery of claim 1, wherein the electrolyte includes at least one selected from the group consisting of a non-aqueous organic electrolytic solution having a lithium salt and an organic solvent mixed therein, and a polymer electrolytic solution having a polymer electrolyte.

3. The secondary battery of claim 2, wherein the lithium salt is at least one selected from the group consisting of $LiPF_6$, $LiBF_4$, and $LiClO_4$.

* * * * *